(12) United States Patent
Yun et al.

(10) Patent No.: US 11,340,006 B2
(45) Date of Patent: May 24, 2022

(54) STORAGE CONTAINER AND REFRIGERATOR HAVING THE SAME

(71) Applicant: LG Electronics Inc., Seoul (KR)

(72) Inventors: Seokjun Yun, Seoul (KR); Gyeyoung Song, Seoul (KR); Younghoon Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 311 days.

(21) Appl. No.: 15/865,979

(22) Filed: Jan. 9, 2018

(65) Prior Publication Data

US 2018/0209713 A1 Jul. 26, 2018

(30) Foreign Application Priority Data

Jan. 25, 2017 (KR) .................. 10-2017-0011845

(51) Int. Cl.
*F25D 11/02* (2006.01)
*F25B 21/02* (2006.01)
(Continued)

(52) U.S. Cl.
CPC .............. *F25D 11/02* (2013.01); *F25B 21/00* (2013.01); *F25B 21/02* (2013.01); *F25D 25/005* (2013.01);
(Continued)

(58) Field of Classification Search
CPC ........ F25D 11/00; F25D 11/02; F25D 25/005; F25D 25/025; F25D 25/02; F25B 21/00;
(Continued)

(56) References Cited

U.S. PATENT DOCUMENTS 4,274,262 A 6/1981 Reed et al.
4,823,554 A 4/1989 Trachtenberg et al.
(Continued)

FOREIGN PATENT DOCUMENTS

CN 102538283 7/2012
DE 1113222 8/1961
(Continued)

OTHER PUBLICATIONS

European Extended Search Report in European Application No. 18150559.5, dated May 28, 2018, 9 pages.
(Continued)

*Primary Examiner* — Brian M King
(74) *Attorney, Agent, or Firm* — Fish & Richardson P.C.

(57) ABSTRACT

A storage container includes a body defining a first opening at a top of the body, a second opening at a bottom of the body, and a space between the first opening and the second opening, a cover configured to open or close the first opening, the cover including an insulation material to thermally insulate the space from an outside of the body, a housing disposed in the space to store items, a thermoelectric element disposed in the second opening, the thermoelectric element including a heat-absorbing surface and a heat-emitting surface, a heat-absorbing heat exchanger that surrounds the housing, contacts the heat-absorbing surface, and is configured to transfer heat from the housing to the heat-absorbing surface, a heat transfer part configured to transfer heat generated from the heat-emitting surface to a wall of the body, and a heat-dissipating part configured to dissipate heat from the heat transfer part.

19 Claims, 8 Drawing Sheets

(51) Int. Cl.
  *F25B 21/00* (2006.01)
  *F25D 25/00* (2006.01)
  *F25D 25/02* (2006.01)

(52) U.S. Cl.
  CPC .... *F25B 2321/0252* (2013.01); *F25D 25/025* (2013.01); *Y02B 30/00* (2013.01)

(58) Field of Classification Search
  CPC ............. F25B 21/02; F25B 2321/0252; F25B 2321/02; F25B 2321/023
  See application file for complete search history.

(56) References Cited

U.S. PATENT DOCUMENTS

| | | | | |
|---|---|---|---|---|
| 5,771,788 | A * | 6/1998 | Lee | A21C 13/00 |
| | | | | 99/468 |
| 8,733,122 | B2 * | 5/2014 | Lim | F25C 1/24 |
| | | | | 62/344 |
| 8,904,808 | B2 * | 12/2014 | Ghoshal | F25B 21/02 |
| | | | | 62/3.2 |
| 9,267,723 | B2 * | 2/2016 | Alfille | F25D 11/00 |
| 2002/0121095 | A1 * | 9/2002 | Adamski | F25B 21/04 |
| | | | | 62/3.6 |
| 2009/0152258 | A1 | 6/2009 | Schandel et al. | |
| 2012/0036869 | A1 * | 2/2012 | Kim | F25B 21/02 |
| | | | | 62/3.4 |
| 2013/0291564 | A1 | 11/2013 | Ghoshal et al. | |
| 2014/0044851 | A1 | 2/2014 | Kennedy | |
| 2014/0354134 | A1 * | 12/2014 | Park | F25D 23/028 |
| | | | | 312/404 |
| 2016/0018139 | A1 | 1/2016 | Olsson et al. | |
| 2016/0377329 | A1 | 12/2016 | Shin et al. | |

FOREIGN PATENT DOCUMENTS

| | | | |
|---|---|---|---|
| KR | 1020110081931 | 7/2011 | |
| WO | 2008074011 | 6/2008 | |
| WO | WO-2012169989 A1 * | 12/2012 | ............. F25B 21/02 |

OTHER PUBLICATIONS

Chinese Office Action in Chinese Application No. 201810022824.7, dated Dec. 4, 2019, 14 pages (with English translation).
Liu & Yu, "Learn Some Life Tips Every Day," Beihang University Press, May 2012, 7 pages (with English translation).
Office Action in Chinese Appln. No. 201810022824.7, dated Sep. 23, 2021, 18 pages (with English translation).

* cited by examiner

STORAGE CONTAINER AND REFRIGERATOR HAVING THE SAME

CROSS-REFERENCE TO RELATED APPLICATIONS

Pursuant to 35 U.S.C. § 119(a), this application claims the benefit of Korean Patent Application No. 10-2017-0011845, filed on Jan. 25, 2017, which is hereby incorporated by reference as if fully set forth herein.

BACKGROUND

Field

The present disclosure relates to a storage container and a refrigerator having the same, and more particularly to a storage container configured to store items at a temperature lower than an external temperature and to a refrigerator having the same.

Related Art

A storage container can be used to store items such as food or the like.

A refrigerator may include a machine room defined in the lower portion of a main body. It is common to form a machine room in the lower portion of a refrigerator in order to lower the center of gravity, to improve assembly efficiency, and to reduce vibration.

A freezing cycle system may be mounted in a machine room of a refrigerator, where the interior of the refrigerator is maintained in a freezing or refrigerating state using a phenomenon in which low-pressure liquid refrigerant absorbs external heat through conversion into gaseous refrigerant, thereby keeping food fresh.

The freezing cycle system of the refrigerator may include a compressor configured to convert low-temperature and low-pressure gaseous refrigerant into high-temperature and high-pressure gaseous refrigerant, a condenser configured to convert the high-temperature and high-pressure gaseous refrigerant, which has been converted by the compressor, into high-temperature and high-pressure liquid refrigerant, and an evaporator configured to convert the high-temperature and high-pressure liquid refrigerant, which has been converted by the condenser, into a gas phase in order to absorb external heat.

Extensive research has been conducted to develop a storage container that is capable of storing food or the like at a temperature lower than an external temperature and that is highly portable to the extent that it can be accommodated in a refrigerator or the like.

SUMMARY

The present disclosure is directed to a storage container and a refrigerator having the same that can solve one or more problems due to limitations and disadvantages of the related art.

An object of the present disclosure is to provide a storage container configured to store items at a temperature different from an external temperature and a refrigerator having the same.

Another object of the present disclosure is to provide a storage container providing a storage space sealed from a storage compartment of a refrigerator and a refrigerator having the same.

A further object of the present disclosure is to provide a storage container configured to store items at a temperature lower than the temperature of a storage compartment and a refrigerator having the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to one aspect of the subject matter described in this application, a storage container includes a body defining a first opening at a top of the body, a second opening at a bottom of the body, and a space surrounded by an insulation material between the first opening and the second opening, a cover configured to open or close at least a portion of the first opening, the cover including an insulation material configured to thermally insulate the space from an outside of the body, a housing disposed in the space and configured to store items, a thermoelectric element disposed in the second opening, the thermoelectric element including a heat-absorbing surface and a heat-emitting surface, a heat-absorbing heat exchanger surrounding the housing, contacting the heat-absorbing surface, and being configured to transfer heat from the housing to the heat-absorbing surface, a heat transfer part configured to transfer heat generated from the heat-emitting surface to a wall of the body, and a heat-dissipating part configured to dissipate heat from the heat transfer part.

Implementations according to this aspect may include one or more of the following features. For example, the housing may include a first front surface, a first rear surface, a first left surface, a first right surface, and a first bottom surface, and the heat-absorbing heat exchanger may include a second front surface, a second rear surface, a second left surface, a second right surface, and a second bottom surface. In some examples, each of the surfaces of the heat-absorbing heat exchanger is configured to contact a corresponding surface of the housing. The heat-absorbing surface may be configured to contact the second bottom surface.

In some implementations, the thermoelectric element may be disposed at a middle position in a forward-and-backward direction of the heat-absorbing heat exchanger. In some examples, the thermoelectric element may be disposed at a middle position in a lateral direction of the heat-absorbing heat exchanger. The heat transfer part may include a plurality of pipes configured to flow fluid therethrough, the plurality of pipes connecting the thermoelectric element to the heat-dissipating part. The plurality of pipes may include a first pipe disposed at a middle position in a lateral direction of the body and extending in a forward-and-backward direction, a second pipe disposed leftward of the first pipe and having one end bent leftward away from the first pipe, and a third pipe disposed rightward of the first pipe and having one end bent rightward away from the first pipe. The body may define an accommodation recess configured to accommodate the pipes and to communicate with the second opening.

In some implementations, the heat-dissipating part may include a heat-dissipating heat exchanger configured to contact the heat transfer part and to dissipate heat; and a fan configured to generate an airflow toward the heat-dissipating heat exchanger. The fan may be disposed rearward of the heat-dissipating heat exchanger. The heat-dissipating heat exchanger may include a plurality of fins that are stacked and spaced apart from each other, and the heat transfer part is arranged to penetrate at least a portion of the plurality of fins. In some examples, the storage container may further include an insulation panel disposed between the heat-dissipating part and the body. The storage container may further include a display part disposed at a front wall of the body. The storage container may further include a battery disposed at the wall of the body and configured to store electric power.

According to another aspect of the subject matter, a refrigerator includes a cabinet, a storage compartment defined in the cabinet and configured to store food, and a storage container configured to define a space sealed from the storage compartment and to maintain the space at a temperature different from a temperature of the storage compartment. The storage container includes a body defining a first opening at a top of the body, a second opening at a bottom of the body, and a space surrounded by an insulation material between the first opening and the second opening, a cover configured to open or close at least a portion of the first opening, the cover including an insulation material configured to thermally insulate the space from an outside of the body, a housing disposed in the space and configured to store items, a thermoelectric element disposed in the second opening, the thermoelectric element including a heat-absorbing surface and a heat-emitting surface, a heat-absorbing heat exchanger surrounding the housing, contacting the heat-absorbing surface, being configured to transfer heat from the housing to the heat-absorbing surface, a heat transfer part configured to transfer heat generated from the heat-emitting surface to a wall of the body, and a heat-dissipating part configured to dissipate heat from the heat transfer part.

Implementations according to this aspect may include one or more of the following features. For example, the heat-absorbing surface may be configured to maintain a temperature lower than a temperature of the storage compartment. The refrigerator may further include a compressor configured to compress refrigerant, and an evaporator configured to supply cool air to the storage compartment based on the refrigerant compressed by the compressor where the evaporator is further configured to supply cool air to cool heat dissipated from the heat-dissipating part.

In some examples, the heat transfer part may include a plurality of pipes configured to flow fluid therethrough where the plurality of pipes connects the thermoelectric element to the heat-dissipating part. The heat-dissipating part may include a heat-dissipating heat exchanger configured to contact the heat transfer part and to dissipate heat, and a fan configured to generate airflow toward the heat-dissipating heat exchanger.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate implementation(s) of the disclosure and together with the description serve to explain the principle of the disclosure.

DETAILED DESCRIPTION

Reference will now be made in detail to the exemplary implementations of the present disclosure, examples of which are illustrated in the accompanying drawings.

In the drawings, the sizes and shapes of elements may be exaggerated for convenience and clarity of description. Also, the terms used in the following description are terms defined taking into consideration of the configuration and the operation of the present disclosure. The definitions of these terms should be determined based on the entire content of this specification because they may be changed in accordance with the intention of a user or operator or a usual practice.

Figure 1:
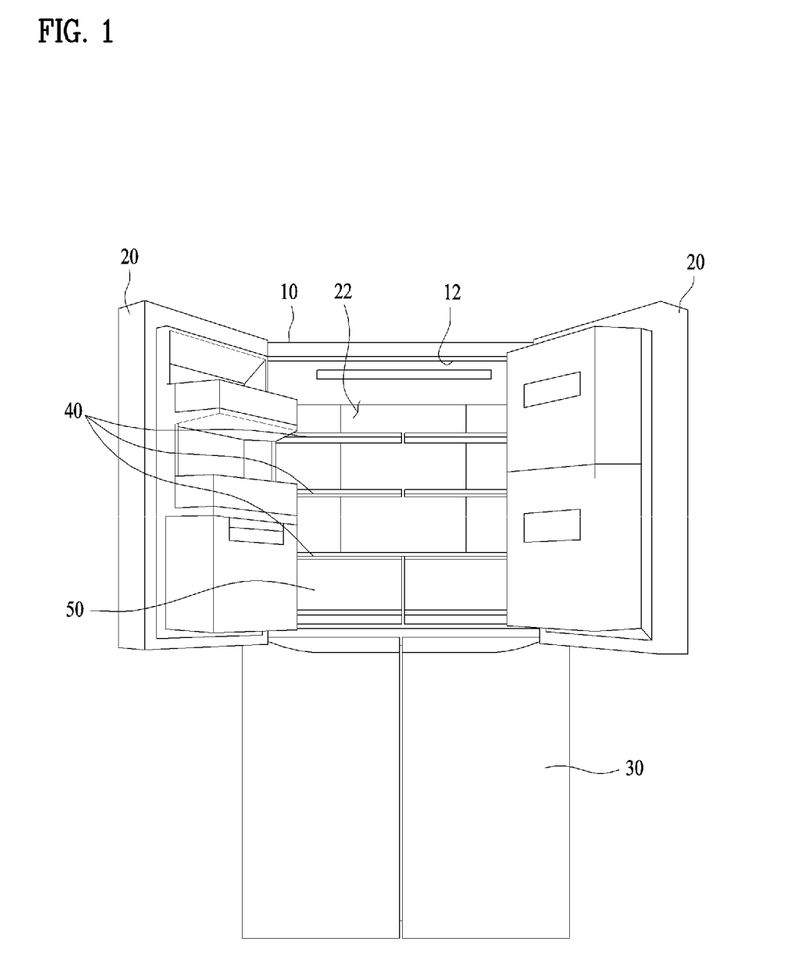
FIG. 1 is a front view of an example refrigerator in a state in which example doors are open.

FIG. 1 is a front view of an example refrigerator in a state in which example doors thereof are open.

The refrigerator can be applicable not only to a top-mount-type refrigerator, in which the storage compartment for storing food is vertically partitioned to define a freezing compartment and a refrigerating compartment such that the freezing compartment is disposed above the refrigerating compartment, but also to a side-by-side-type refrigerator, in which the storage compartment is laterally partitioned to define a freezing compartment and a refrigerating compartment such that the freezing compartment and the refrigerating compartment are laterally arranged.

However, for convenience of explanation, the implementations will be described with reference to a bottom-freezer-type refrigerator, in which the storage compartment is vertically partitioned to define a freezing compartment and a refrigerating compartment such that the freezing compartment is disposed under the refrigerating compartment.

The cabinet of the refrigerator includes an outer case 10 defining an overall external appearance of the refrigerator seen by the user and an inner case 12 defining a storage compartment 22 for storing food. A predetermined space may be defined between the outer case 10 and the inner case 12 to form a passage allowing cool air to circulate therethrough. In addition, an insulation material may fill the space between the outer case 10 and the inner case 12 to maintain the interior of the storage compartment 22 at a low temperature relative to the exterior of the storage compartment 22.

In addition, a refrigerant cycle system configured to circulate refrigerant to produce cool air is installed in a machine room defined in the space between the outer case 10 and the inner case 12. The refrigerant cycle system may be used to maintain the interior of the refrigerator at a low temperature to maintain the freshness of the food stored in the refrigerator. The refrigerant cycle system includes a compressor configured to compress the refrigerant and an evaporator configured to change the refrigerant from the liquid state to the gaseous state such the refrigerant exchanges heat with the exterior.

The refrigerator is provided with doors 20 and 30 to open or close the storage compartment. The doors may include a freezing compartment door 30 and a refrigerating compartment door 20. One end of each of the doors may be pivotably installed to the cabinet of the refrigerator by hinges. A plurality of freezing compartment doors 30 and a plurality of refrigerating compartment doors 20 may be provided. For example, as shown in FIG. 1, the freezing compartment doors 30 and the refrigerating compartment doors 20 may be installed to be opened forward by rotating about both edges of the refrigerator.

The space between the outer case 10 and the inner case 12 may be filled with a foaming agent to insulate the storage compartment 22 from the exterior.

An insulated space may be defined in the storage compartment 22 by the inner case 12 and the door 20. Once the storage compartment 22 is closed by the door 20, an isolated and insulated space may be defined therein. In other words, the storage compartment 22 is isolated from the external environment by the insulation wall of the door 20 and the insulation wall of the cases 10 and 12.

Cool air supplied from the machine room may flow toward a plurality of areas in the storage compartment 22. Accordingly, the food stored in the storage compartment 22 may be maintained at a low temperature.

The storage compartment 22 may include a shelf 40 on which food items may be placed. In some examples, the storage compartment 22 may include a plurality of shelves 40, and food may be placed on each of the shelves 40. The shelves 40 may be positioned horizontally to partition the interior of the storage compartment.

A drawer 50 is installed in the storage compartment 22 such that the drawer 50 may be introduced into or withdrawn from the storage compartment 22. Items such as food may be accommodated and stored in the drawer 50. It may be possible to dispose two or more drawers 50 side by side in the storage compartment 22. For example, the user may open the left door of the storage compartment 22 to reach the drawer disposed on the left side. The user may open the right door of the storage compartment 22 to reach the drawer disposed on the right side.

The interior of the storage compartment 22 may be partitioned into a space positioned over the shelves 40 and a space defined by the drawer 50 to provide a plurality of partitioned spaces to store food.

The cool air supplied to a storage compartment may not be allowed to freely move to another storage compartment, but may be allowed to freely move to the partitioned spaces defined in the storage compartment. For example, the cool air located over the shelf 40 is allowed to move into the space defined by the drawer 50.

Figure 2:
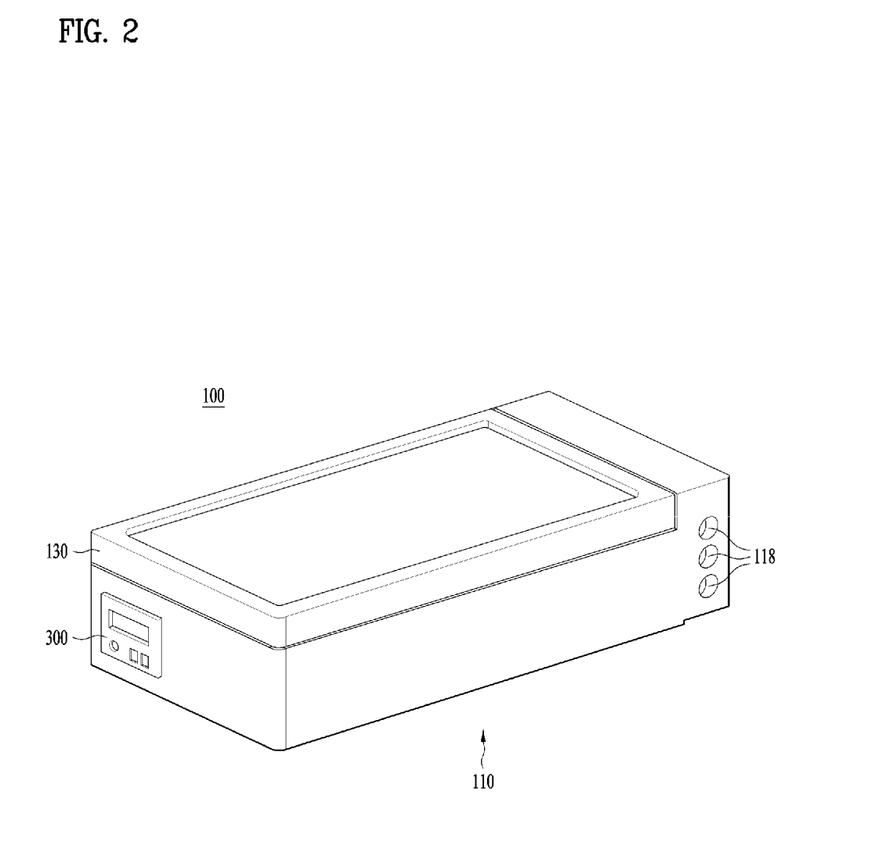
FIG. 2 is a view illustrating an upper portion of an example storage container.
Figure 3:
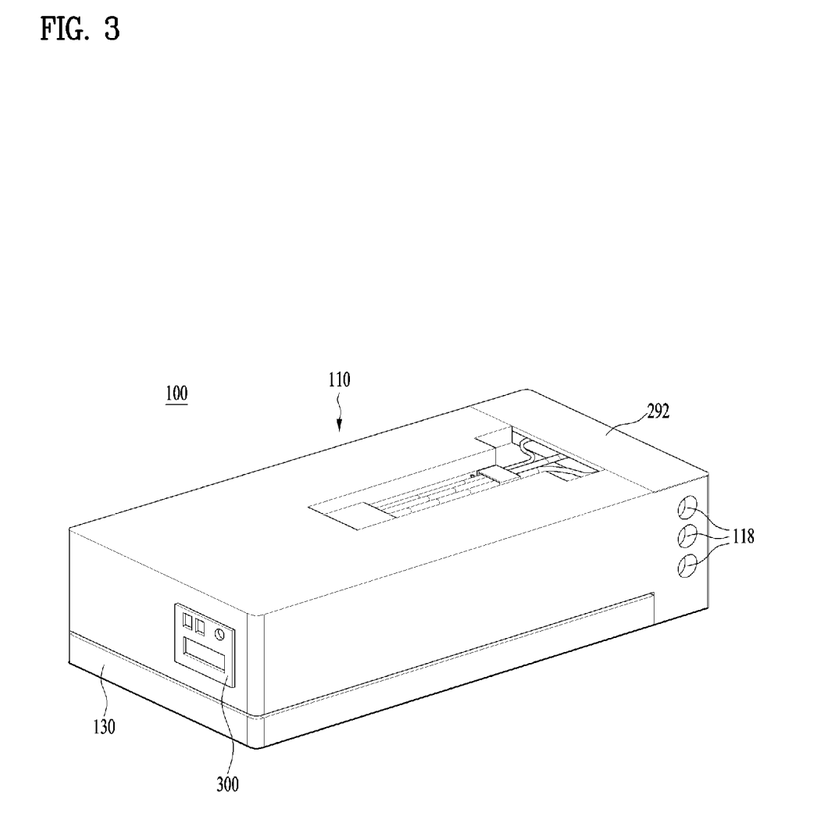
FIG. 3 is a view illustrating a lower portion of the example storage container shown in FIG. 2.

FIG. 2 is a view illustrating an upper portion of an example storage container, and FIG. 3 is a view illustrating the lower portion of the example storage container shown in FIG. 2.

Referring to FIGS. 2 and 3, the storage container includes a body 110 defining the external appearance thereof and a cover 130 installed to the upper portion of the body 110.

The body 110 and the cover 130 are provided with insulation materials so that the space sealed by the body 110 and the cover 130 may be maintained at a temperature different from a temperature outside the storage container 100.

For example, food items or the like that need to be stored at a temperature lower than the external temperature may be stored in the storage container 100.

Figure 4:
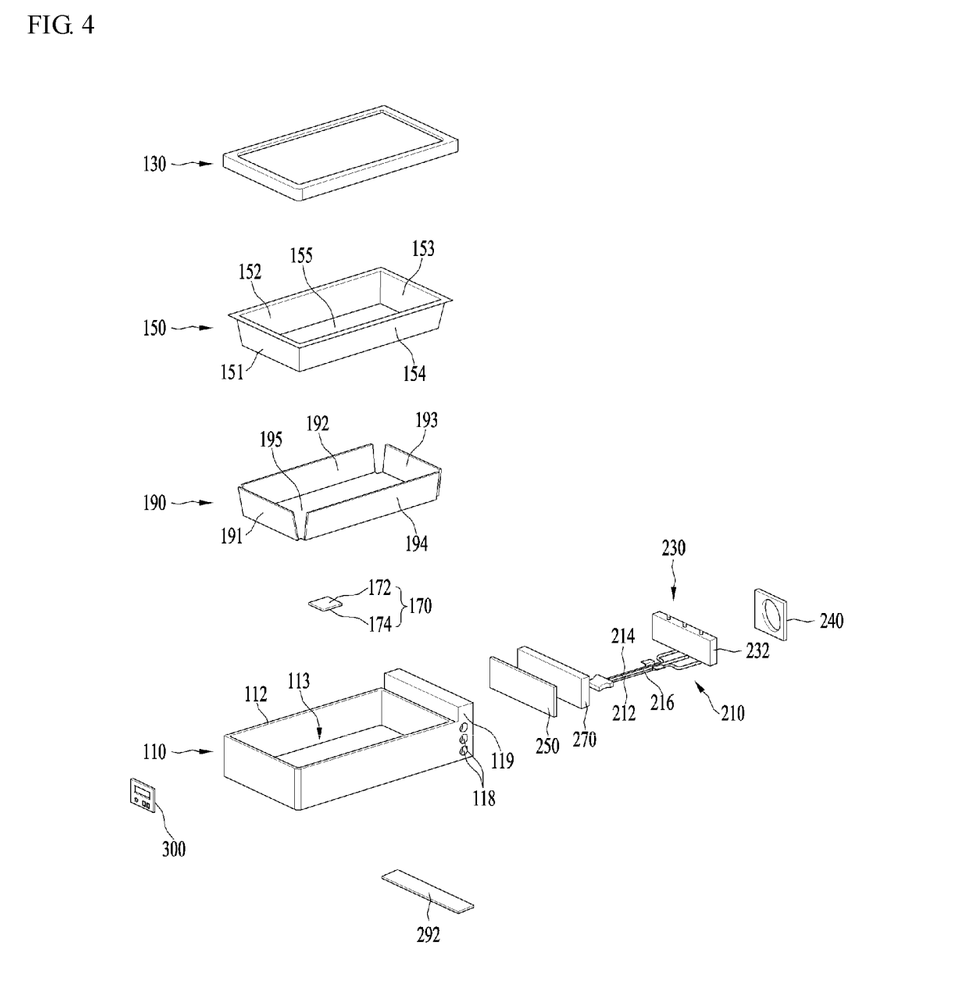
FIG. 4 is an exploded perspective view of FIG. 2.
Figure 5:
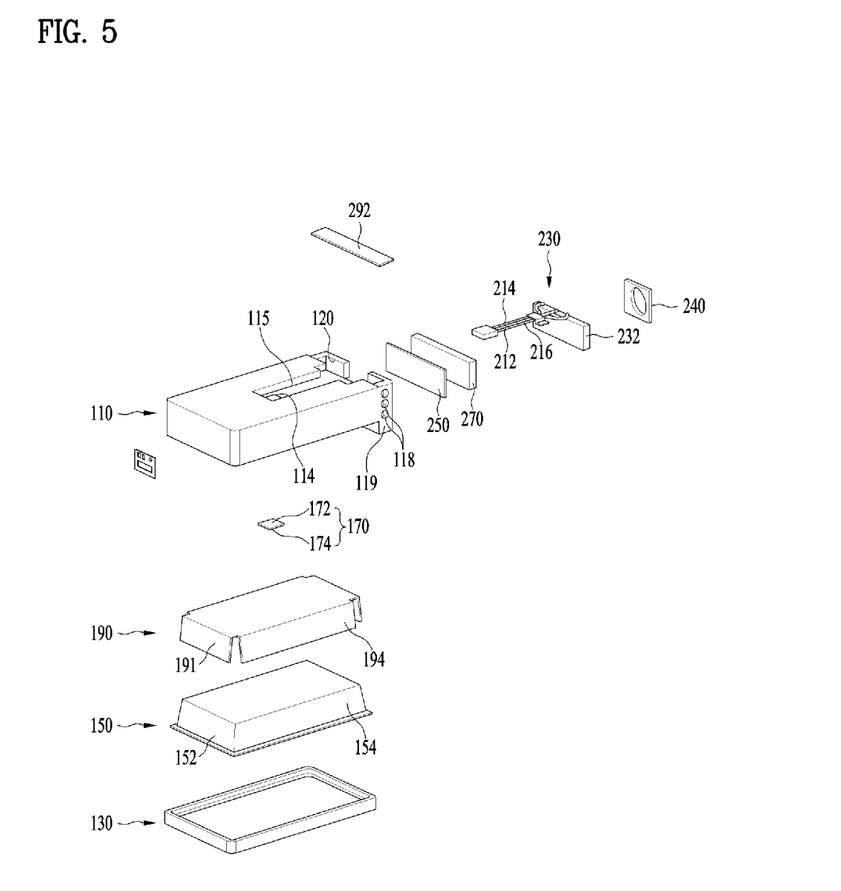
FIG. 5 is an exploded perspective view of FIG. 3.
Figure 6:
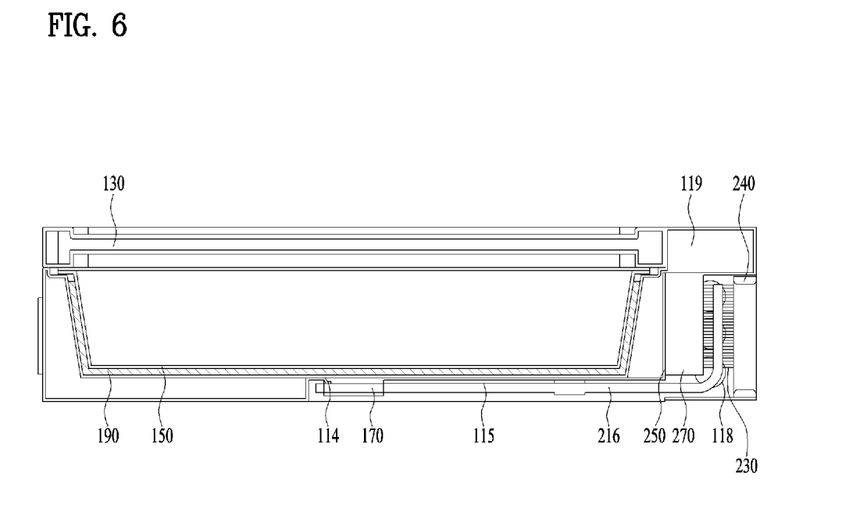
FIG. 6 is a side sectional view of FIG. 2.
Figure 7:
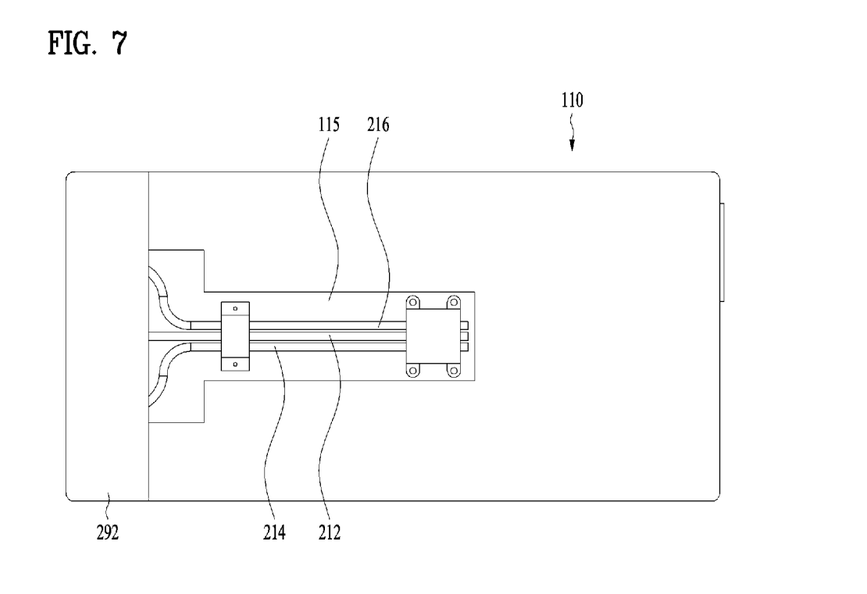
FIG. 7 is a view illustrating example essential components in the lower portion of the storage container shown in FIG. 3.
Figure 8:
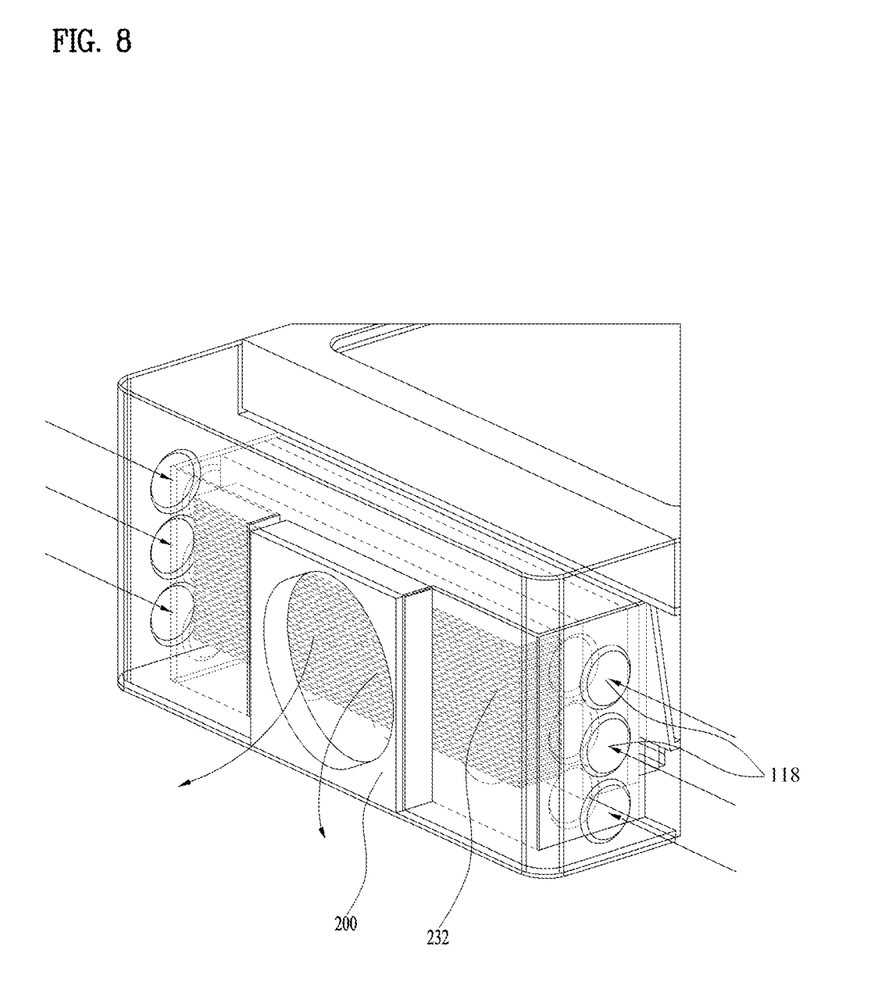
FIG. 8 is a view illustrating example essential components in the rear portion of the storage container shown in FIG. 2.
Figure 9:
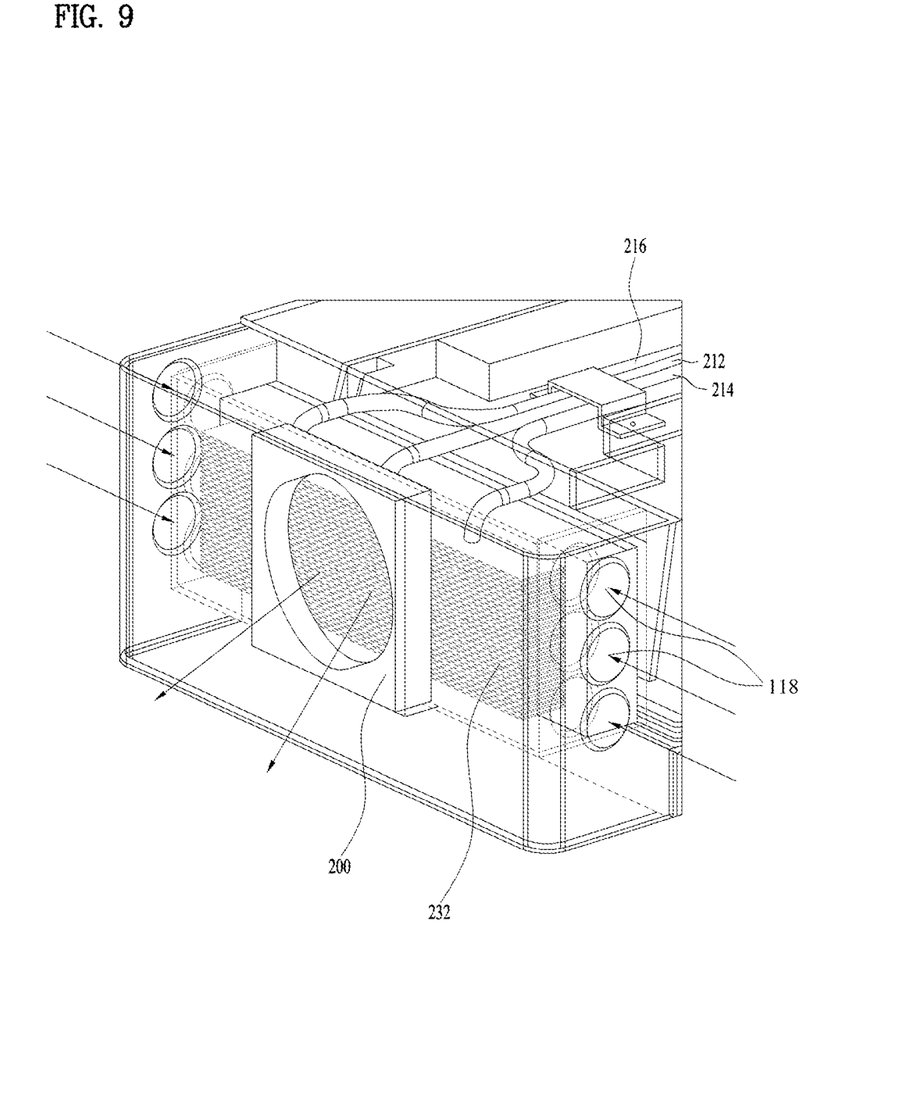
FIG. 9 is a view illustrating example essential components in the rear portion of the storage container shown in FIG. 3.

FIG. 4 is an exploded perspective view of FIG. 2, FIG. 5 is an exploded perspective view of FIG. 3, FIG. 6 is a side sectional view of FIG. 2, FIG. 7 is a view illustrating example essential components in the lower portion of the storage container shown in FIG. 3, FIG. 8 is a view illustrating example essential components in the rear portion of the storage container shown in FIG. 2, and FIG. 9 is a view illustrating example essential components in the rear portion of the storage container shown in FIG. 3.

For example, the storage container will be described with reference to FIGS. 3 to 9. The storage container 100 includes a body 110, which has a first opening 112 defined in the top thereof, a second opening 114 defined in the bottom thereof, and a space 113 surrounded by an insulation material and disposed between the first opening 112 and the second opening 114, a cover 130, which is configured to open or close the first opening 112 and is provided with an insulation material to thermally insulate the space 113 from the outside of the body 110, a housing 150, which is disposed in the space 113 to store items, a thermoelectric element 170, which is disposed in the second opening 114 and has a heat-absorbing surface 172 and a heat-emitting surface 174, a heat-absorbing heat exchanger 190, which is disposed to surround the housing 150 and is in contact with the heat-absorbing surface 172 to transfer heat from the housing 150 to the heat-absorbing surface 172, a heat transfer part 210, which transfers heat generated from the heat-emitting surface 174 to a rear wall 119 of the body 110, and a heat-dissipating part 230, which dissipates heat from the heat transfer part 210.

The storage container 100 includes a body 110 defining the external appearance of the lower portion thereof and a cover 130 defining the external appearance of the upper portion thereof.

The cover 130 is configured to open and close at least a portion of the first opening 112 in the body 110, where the user is able to put an item into the body 110 after removing the cover 130 from the body 110. After the item is completely put into the body 110, the cover 130 may be installed back to the body 110 to form a space sealed from the exterior, thereby maintaining the sealed space at a temperature lower than the external temperature.

The cover 130 has an area slightly larger than the first opening 112, and an insulation material may be provided over the area thereof.

The housing 150 includes a first front surface 151, a first rear surface 153, a first left surface 152, a first right surface 154, and a first bottom surface 155, and has an opening defined in the top thereof.

Items may be accommodated in the space defined by the respective surfaces.

The heat-absorbing heat exchanger 190 includes a second front surface 191, a second rear surface 193, a second left surface 192, a second right surface 194, and a second bottom surface 195. Each of the surfaces of the heat-absorbing heat exchanger 190 is disposed so as to be in contact with a corresponding one of the surfaces of the housing 150. Therefore, heat from each of the surfaces of the housing 150 may be easily transferred to a corresponding one of the surfaces of the heat-absorbing heat exchanger 190.

The heat-absorbing heat exchanger 190 may be made of a metal material having a high heat conductivity. The heat-absorbing heat exchanger 190 may transfer heat from the housing 150 to the thermoelectric element 170 through the heat-absorbing heat exchanger 190.

The heat-absorbing heat exchanger 190 also has an opening defined in the top thereof, through which the heat-absorbing heat exchanger 190 and the housing 150 may be assembled with each other. The body 110 also includes four side walls and one bottom surface, and has a first opening 112 defined in the top thereof. The second opening 114 is defined in the bottom of the body 110. The second opening 114 may be smaller than the first opening 112, for instance. The space above the bottom of the body 110 and the space under the same may communicate with each other through the second opening 114.

The housing 150 and the heat-absorbing heat exchanger 190 are mounted in the space 113 defined by the four side walls and the bottom surface.

An insulation material is provided on the four side walls and the bottom surface of the body 110 so as to insulate the space 113 from the outside.

The thermoelectric element 170 is provided in the second opening 114. When electric current is supplied to the thermoelectric element 170, one surface thereof absorbs heat and the opposite surface thereof emits heat.

The top surface of the thermoelectric element 170 is a heat-absorbing surface 172, and the bottom surface of the same is a heat-emitting surface 174. The difference in temperature between the heat-absorbing surface 172 and the heat-emitting surface 174 may be maintained constant. The temperature of the heat-emitting surface 174 may be similar to the external temperature.

For example, when the difference in temperature between the heat-absorbing surface 172 and the heat-emitting surface 174 is 40° C. and the external temperature is 0° C., the temperature of the heat-absorbing surface 172 may be −40° C. Therefore, the storage container 100 may be maintained at a low temperature by the thermoelectric element 170.

In other examples, when the difference in temperature between the heat-absorbing surface 172 and the heat-emitting surface 174 is 40° C. and the external temperature is 20° C., the temperature of the heat-absorbing surface 172 may be −20° C. Therefore, the storage container 100 may be maintained at a high temperature relative to the aforementioned example by the thermoelectric element 170.

In some implementations, the temperature of the space 113 may be maintained at different temperatures in accordance with the external temperature by the thermoelectric element 170.

In some implementations, a display part 300, which may display the operating state of the thermoelectric element 170 or the temperature of the space defined by the housing 150, may be provided at the front wall of the four side walls of the body 110. The display part 300 may provide the user with information related to the storage container 100.

In some examples, the display part 300 may be provided with buttons for operating the thermoelectric element 170. When the user manipulates the buttons of the display part 300 to activate the thermoelectric element 170, the internal temperature of the storage container 100 may be maintained lower than the external temperature.

In some examples, a user may reduce the amount of energy that is consumed by the thermoelectric element 170 through user manipulation of the buttons to stop or adjust the operation of the thermoelectric element 170.

The thermoelectric element 170 may be provided in the second opening 114 such that the heat-absorbing surface 172 is in contact with the second bottom surface 195 of the heat-absorbing heat exchanger 190. Therefore, the internal heat in the housing 150 may be transferred to the heat-absorbing surface 172 via the housing 150 and the heat-absorbing heat exchanger 190, thereby cooling the interior of the housing 150.

In some examples, the thermoelectric element 170 may be disposed at the middle in the forward-and-backward direction of the heat-absorbing heat exchanger 190 so as to evenly absorb heat in the forward-and-backward direction of the heat-absorbing heat exchanger 190.

In other examples, the thermoelectric element 170 may be disposed at the middle in the lateral direction of the heat-absorbing heat exchanger 190 so as to evenly absorb heat in the lateral direction of the heat-absorbing heat exchanger 190.

In some examples, the heat-absorbing heat exchanger 190 is disposed such that most area (e.g., the entire area) thereof is in contact with the housing 150, and the interior of the housing 150 may be evenly cooled by a single thermoelectric element 170. In other examples, the heat-absorbing heat exchanger 190 may include one or more heat-absorbing heat exchangers.

The heat transfer part 210 is disposed so as to be in contact with the heat-emitting surface 174, where the heat emitted from the heat-emitting surface 174 of the thermoelectric element 170 is transferred to the heat-dissipating part 230.

The heat transfer part 210 includes a plurality of pipes, through which fluid flows and which connect the thermoelectric element 170 to the heat-dissipating part 230.

For example, the pipes include a first pipe 212, which is disposed at the middle position and extends in the forward-and-backward direction, a second pipe 214, which is disposed to the left of the first pipe 212 and has one end bent leftward away from the first pipe 212, and a third pipe 216, which is disposed to the right of the first pipe 212 and has one end bent rightward away from the first pipe 212.

The pipes may include three pipes configured to allow liquid to flow therethrough, and the liquid may transfer heat while flowing through the pipes.

Because the thermoelectric element 170 is disposed at the middle in the forward-and-backward direction (the longitudinal direction) of the housing 150, each of the pipes has a length greater than half the length of the housing 150. In example where the distance through which the liquid flows via the pipes is sufficient, a heat transfer rate may be improved.

The ends of the pipes that are oriented toward the thermoelectric element 170 are arranged close to each other and are in contact with the thermoelectric element 170. The opposite ends of the pipes, which are oriented away from the thermoelectric element 170, are arranged so as to be spaced apart from each other.

The body 110 has therein an accommodation recess 115 defined so as to communicate with the second opening 114. The pipes are accommodated in the accommodation recess 115 so that the pipes may not be exposed from the body 110.

The pipes are made of a metal material having a high heat transfer efficiency so that heat transfer is easily accomplished through the pipes as well as the liquid accommodated in the pipes. Accordingly, heat emitted from the heat-emitting surface 174 may be easily transferred.

The heat-dissipating part 230 may include a heat-dissipating heat exchanger 232, which is in contact with the heat transfer part 210 and dissipates heat, and a fan 240, which generates airflow toward the heat-dissipating heat exchanger 232.

The fan 240 may be disposed behind the heat-dissipating heat exchanger 232.

The heat-dissipating heat exchanger 232 may include a plurality of fins, which are stacked so as to be spaced apart from each other, thereby increasing the area through which heat is dissipated outside. In some examples, the fins may be defined in a plate shape and have the same area as each other. In some cases, the plate-shaped fins are arranged so as to be equidistantly spaced apart from each other.

The heat transfer part 210 is arranged so as to penetrate a large portion of the fins (e.g., all of the fins), thereby transferring heat from the heat-emitting surface 174 to the respective fins.

The heat-dissipating heat exchanger 232 is disposed behind the rear wall 119 of the four side walls of the body 110. The fan 240 is disposed behind or rearward of the heat-dissipating heat exchanger 232.

An accommodation recess 120 is defined in the rear wall 119, which may reduce the thickness of the rear wall 119. The heat-dissipating heat exchanger 232 and the fan 240 are accommodated in the accommodation recess 120 such that the heat-dissipating heat exchanger 232 and the fan 240 are not outwardly exposed.

An insulation panel 250 may be disposed between the heat-dissipating heat exchanger 232 and the rear wall 119.

An insulation material is provided over the area of the body 110. However, in order to increase the insulation performance, the insulation panel 250 may be provided at the portion of the body 110 at which the heat-dissipating heat exchanger 232 is disposed. For example, the insulation panel 250 may be smaller than the rear wall 119, but equal to or greater than the heat-dissipating heat exchanger 232, thereby preventing heat from the heat-dissipating heat exchanger 232 from being transferred to the rear wall 119.

In order to improve the portability of the storage container 100, there may be provided a battery 270, in which electric power for supplying current to the thermoelectric element 170 and the fan 240 is charged.

When an electric current is supplied from the battery 270 to the thermoelectric element 170 or the fan 240, the battery 270 may also generate heat. In order to prevent heat generated from the battery 270 from being transferred to the food stored in the housing 150, the battery 270 may be disposed behind the insulation panel 250.

In some cases, the battery 270 may be heavy relative to the other components of the storage container 100. Therefore, it may be possible to ensure the stability of the storage container 100 by placing the battery 270 at a rear portion of the storage container 100 so that the center of gravity of the storage container 100 is positioned at the rear portion of the storage container 100.

In some implementations, the rear wall 119 may define through-holes 118 in both sides thereof. The accommodation recess 120 may communicate with the outside of the rear wall 119 through the through-holes 118. Therefore, airflow generated by the fan 240 may be directed backward from the rear wall 119, and air may be introduced into the accommodation recess 120 through the through-holes 118.

Since the inflow and outflow of air are maintained constant by the fan 240, the efficiency with which the heat-dissipating heat exchanger 232 is cooled may be improved.

By placing the storage container 100 in the freezing compartment or the refrigerating compartment, the user may use a sealed space that is maintained at a temperature different from the temperature of the freezing compartment or the refrigerating compartment.

The bottom of the accommodation recess 120 defined in the rear wall 119 may be closed by a bottom cover 292. Accordingly, the heat-dissipating heat exchanger 232 may be disposed so as to avoid being exposed to the user.

For example, in a state in which food such as meat is stored at a temperature of −20° C. in the freezing compartment, if the user wants to store other kinds of food at a temperature of −40° C., the user may put the storage container 100 into the freezing compartment. In this example, if the thermoelectric element 170 is driven so that the difference in temperature between the heat-emitting surface 174 and the heat-absorbing surface 172 of the thermoelectric element 170 is 20° C., the inner space in the storage container 100 may be maintained at a temperature of −40° C.

At this time, the heat-absorbing surface 172 is maintained at a temperature lower than the temperature of the storage compartment, such as the freezing compartment, where the interior of the storage container 100 may be maintained at a temperature lower than the temperature of the storage compartment.

Heat dissipated from the storage container 100 may be cooled by cool air produced by the evaporator provided in the refrigerator. The evaporator may supply cool air, which has undergone heat exchange with refrigerant compressed by the compressor, to the storage compartment.

The user may easily obtain a sealed space, which is maintained at a temperature lower than the temperature of the freezing compartment, using the storage container 100.

In some examples, since the storage container 100 is driven by the battery 270, the user may easily shift the position of the storage container 100 from the freezing compartment to the refrigerating compartment or vice versa. For example, the user may put the storage container 100 into the refrigerating compartment or the freezing compartment as desired. In some cases, the user may also place the storage container 100 outside the refrigerator, rather than into the refrigerating compartment or the freezing compartment.

If the user activates the thermoelectric element 170 through the display part 300, the heat-emitting surface 174 emits heat, and the heat-absorbing surface 172 is cooled. Therefore, heat from the housing 150 is transferred to the heat-absorbing surface 172 via the periphery of the housing 150 and the heat-absorbing heat exchanger 190. Therefore, the inner space in the housing 150 is cooled, where items may be stored at a low temperature in the housing 150.

Heat emitted from the heat-emitting surface 174 is transferred to the heat-dissipating heat exchanger 232 through the pipes. The fluid, which is movably accommodated in the pipes, may transfer heat while flowing through the pipes. In addition, heat may also be transferred to the heat-dissipating heat exchanger 232 by the pipes themselves.

In some implementations, the first pipe 212, the second pipe 214, and the third pipe 216, which constitute the aforementioned pipes, may extend in mutually different directions so that the fluid accommodated therein flows along various routes. In this case, since the first pipe 212, the second pipe 214 and the third pipe 216 are in contact with the heat-emitting surface 174, heat is transferred to the heat-dissipating heat exchanger 232 via the various routes.

In some examples, the heat-dissipating heat exchanger 232 may be heated by heat transferred thereto from the heat transfer part 210.

The fan 240, which discharges air backward from the storage container 100, may be an axial flow fan, for instance.

Air may be introduced into the accommodation recess 120 through the through-holes 118 defined in the left side and the right side of the rear wall 119, and air in the accommodation recess 120 may be discharged backward from the storage container 100 by the fan 240.

This airflow leads to heat exchange between the heat-dissipating heat exchanger 232 and the external air, thereby cooling the heat-dissipating heat exchanger 232. Therefore, heat in the housing 150 is dissipated outside the storage container 100 by the thermoelectric element 170, and the interior of the housing 150 may be maintained at a low temperature relative to the exterior.

As is apparent from the above description, the present disclosure provides a storage container, which may store items at a temperature different from the external temperature.

In addition, it may be possible to store food in a sealed space, thereby preventing the smell of the exterior from permeating the stored food and also preventing the smell of the stored food from escaping to the exterior.

In addition, it may be possible to store food at a temperature lower than the temperature of a storage compartment of a refrigerator.

For example, when the storage container is placed in a refrigerating compartment or a freezing compartment of a refrigerator, food may be stored in the storage container at a temperature lower than the temperature of the storage compartment of the refrigerator.

In addition, since the storage container is portable, a user may place the storage container in the storage compartment of the refrigerator after putting food in the storage container or may take food out of the storage container after withdrawing the storage container from the storage compartment as desired, thereby improving convenience in use.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A refrigerator comprising:
   a cabinet;
   a storage compartment defined in the cabinet and configured to store food, the storage compartment comprising a freezing compartment and a refrigerating compartment; and
   a storage container that is configured to be placed in the freezing compartment or the refrigerating compartment, the storage container defining an inner space sealed from the storage compartment and being configured to maintain the inner space at a temperature less than a temperature of the freezing compartment or the refrigerating compartment in which the storage container is placed,
   wherein the storage container comprises:
      a body defining a first opening at a top of the body and a second opening at a bottom of the body, a portion of the inner space being surrounded by an insulation material and defined between the first opening and the second opening;
      a cover configured to open or close at least a portion of the first opening, the cover being configured to thermally insulate another portion of the inner space from an outside of the body;
      a housing disposed in the inner space and configured to store items;
      a thermoelectric element disposed in the second opening, the thermoelectric element comprising a heat-absorbing surface and a heat-emitting surface;
      a heat-absorbing heat exchanger surrounding the housing, contacting the heat-absorbing surface, and being configured to transfer heat from the housing to the heat-absorbing surface;
      a heat transfer part configured to transfer heat generated from the heat-emitting surface to a rear wall of the body;
      a heat-dissipating part arranged at the rear wall of the body and configured to dissipate heat from the heat transfer part; and
      a battery that is configured to store electric power and supply the electric power to the thermoelectric element and that is disposed behind the rear wall of the body to block transfer of heat generated from the battery to the food stored in the housing,
   wherein the housing includes a first front surface, a first rear surface, a first left surface, a first right surface, and a first bottom surface,
   wherein the heat-absorbing heat exchanger includes a second front surface in contact with the first front surface, a second rear surface in contact with the first rear surface, a second left surface in contact with the first left surface, a second right surface in contact with the first right surface, and a second bottom surface having an upper side in contact with the first bottom surface of the housing and a lower side in contact with the heat-absorbing surface,
   wherein the thermoelectric element is disposed at a middle position that is (i) between the second front surface and the second rear surface of the heat-absorbing heat exchanger and (ii) between the second left surface and the second right surface of the heat-absorbing heat exchanger, and
   wherein the heat-dissipating part includes:
      a heat-dissipating heat exchanger configured to contact the heat transfer part and to dissipate heat; and
      a fan disposed rearward of the heat-dissipating heat exchanger and configured to generate an airflow toward the heat-dissipating heat exchanger.

2. The refrigerator according to claim 1, wherein the heat transfer part includes a plurality of pipes configured to flow fluid therethrough, the plurality of pipes connecting the thermoelectric element to the heat-dissipating part.

3. The refrigerator according to claim 2, wherein the plurality of pipes include:
   a first pipe disposed at a middle position in a lateral direction of the body and extending in a forward-and-backward direction;
   a second pipe disposed leftward of the first pipe and having one end bent leftward away from the first pipe; and
   a third pipe disposed rightward of the first pipe and having one end bent rightward away from the first pipe.

4. The refrigerator according to claim 2, wherein the body defines an accommodation recess configured to accommodate the pipes, and
   wherein the accommodation recess communicates with the second opening.

5. The refrigerator according to claim 1, wherein the heat-dissipating heat exchanger includes a plurality of fins that are stacked and spaced apart from each other, and wherein the heat transfer part is arranged to penetrate at least a portion of the plurality of fins.

6. The refrigerator according to claim 1, further comprising an insulation panel disposed between the heat-dissipating part and the body.

7. The refrigerator according to claim 1, further comprising a display part disposed at a front wall of the body.

8. The refrigerator according to claim 1, wherein the heat-absorbing surface is configured to maintain the temperature of the storage container lower than the temperature of the freezing compartment or the refrigerating compartment in which the storage container is placed.

9. The refrigerator according to claim 1, further comprising:
- a compressor configured to compress refrigerant; and
- an evaporator configured to supply cool air to the storage compartment based on the refrigerant compressed by the compressor,
wherein the evaporator is further configured to supply cool air to cool heat dissipated from the heat-dissipating part.

10. The refrigerator according to claim 1, wherein the battery is disposed between the rear wall of the body and the heat-dissipating part.

11. The refrigerator according to claim 10, further comprising an insulation panel disposed between the rear wall of the body and the battery.

12. The refrigerator according to claim 11, wherein the battery is disposed between the insulation panel and the heat transfer part, and
wherein the heat transfer part is disposed between the battery and the heat-dissipating part.

13. The refrigerator according to claim 1, wherein the housing is in surface contact with an entire area of each of the second front surface, the second rear surface, the second left surface, the second right surface, and the second bottom surface of the heat-absorbing heat exchanger.

14. The refrigerator according to claim 1, wherein the body defines through-holes at sides of the rear wall of the body.

15. The refrigerator according to claim 14, wherein the body defines an accommodation recess that accommodates the heat-dissipating part.

16. The refrigerator according to claim 15, wherein the accommodation recess is in communication with the outside of the body through the through-holes of the rear wall, the accommodation recess being configured to, based on the fan generating the airflow toward the heat-dissipating heat exchanger, receive air from the outside of the body through the through-holes of the rear wall of the body.

17. The refrigerator according to claim 16, wherein the through-holes include a left through-hole defined at a left side of the rear wall of the body, and a right through-hole defined at a right side of the rear wall of the body, and
wherein the fan is configured to generate the airflow laterally from the left through-hole and the right through-hole toward each other into the accommodation recess.

18. The refrigerator according to claim 17, wherein the accommodation recess is further in communication with the outside of the body through the fan, and
wherein the fan is configured to discharge air from the accommodation recess rearward of the rear wall of the body.

19. The refrigerator according to claim 1, wherein the fan is configured to discharge air rearward of the rear wall of the body.

* * * * *